United States Patent Office 2,931,732
Patented Apr. 5, 1960

2,931,732

FRESH MEAT PACKAGE AND METHOD

William August Hoffman, James Phillip Janosik, and James Samuel Ten Broeck, Jr., Richmond, Va., assignors to E. I. du Pont de Nemours and Company, Wilmington, Del., a corporation of Delaware No Drawing. Application December 24, 1957
Serial No. 704,876

6 Claims. (Cl. 99—174)

This invention relates to the packaging of meat products and more particularly to the packaging of fresh meats in transparent regenerated cellulose film.

In the packaging of fresh meat, such as beef, pork, lamb and veal, for sale in self-service meat stores, it has become customary to wrap the fresh meat in transparent regenerated cellulose film which has a moistureproof coating on one side of the film. The uncoated side is placed in direct contact with the fresh meat. It has been found, however, that fresh meat wrapped in this manner tends to develop discoloration in the form of brown spots shortly after being wrapped, thus making the packaged meat unattractive to the potential buyer.

An object of this invention, therefore, is to provide a package comprising fresh meat enveloped in a transparent, flexible, heat-sealable regenerated cellulose film wrapper effective to maintain the color and condition of the fresh meat for relatively long periods of time. Another object is to provide a method for preserving the color and condition of fresh meat in attractive packaged form. The foregoing and other objects will more clearly appear from the description which follows:

These objects are realized by the present invention which, briefly stated, comprises wrapping fresh meat in a transparent, flexible wrapper comprising regenerated cellulose base film uniformly coated on one side only with from 2 to 4 grams per square meter of a conventional type of moistureproof, heat-sealable, continuous (unbroken) coating composition for regenerated cellulose modified by substituting for the usual moistureproofing waxy constituent of the conventional coating composition an ester of pentaerythritol and a saturated aliphatic monocarboxylic acid having from 12 to 35 carbon atoms, the coated film having an oxygen permeability value of at least 20, the uncoated surface of said base film being placed in contact with said fresh meat and constituting the inner surface of said wrapper.

Moistureproofing, heat-sealable coating compositions for regenerated cellulose film are well known to the art (cf., U.S. Patents Numbers 1,997,583, 2,079,379, 2,192,-314 and 2,307,057) and comprise essentially a film-former, eg., nitrocellulose, ethyl cellulose, chlorinated rubber, n-butyl methacrylate polymer, etc.; a plasticizer (when needed) such as dicyclohexyl phthalate, dibutyl phthalate, etc.; a moistureproofing agent, generally Asiatic wax (M.P. 60° C.); and a blending agent such as dewaxed Dammar, polymerized rosin, ester gum, etc., all dissolved in a suitable volatile organic solvent or solvent mixture.

For purposes of the present invention there is used in place of the usual moistureproofing agent heretofore employed at least one ester, e.g., one or more of the mono-, di-, tri-, and tetra-esters of pentaerythritol and a saturated aliphatic monocarboxylic acid (saturated fatty acid) having a carbon atom content of from 12 to 35 carbon atoms. Pentaerythritol tetrastearate is the preferred ester. To insure an oxygen permeability value of not less than 20 and a satisfactory degree of moistureproofness, the pentaerythritol ester content of the coating composition may be varied within the range of from 0.5% to 3.0% by weight of ester, based on the total weight of solids in said composition.

The modified coating composition may be applied to the base film by any convenient expedient suitable for single side coating, such as reverse roll coating, spraying, brushing, etc. The coating should be uniformly distributed over one side of the base film at the rate of from 2 to 4 grams of coating (dry basis) per square meter of film surface. In the preferred embodiment of this invention, the transparent base regenerated cellulose film is first pretreated with an anchoring resin, such as disclosed in U.S. Patents Numbers 2,159,007, 2,280,829, 2,432,542, 2,533,557 and 2,546,575, to promote adhesion of the coating to the base sheet.

The coated film is wrapped around fresh meat, the uncoated side always being placed next to the meat and heat-sealed in conventional manner. As shown hereinafter, no brown spot discoloration occurs even after five days in a refrigerated showcase.

The following examples of preferred embodiments will serve to further illustrate the principles and practice of this invention:

EXAMPLE 1

Transparent, regenerated cellulose film, 0.0012" thick when dry was first pretreated with a guanidine-modified urea-formaldehyde anchoring resin, such as described in Chapman, U.S. Patent No. 2,533,557, applied in an aqueous solution containing glycerol as a softener for the base film. After drying, the film was coated on one side at the rate of three grams of solids per square meter of film, with the following oxygen-transmitting, heat-sealable coating composition:

| | Parts by weight |
|---|---|
| Nitrocellulose (11.4% nitrogen) | 76.8 |
| Dibutyl phthalate | 27.2 |
| Dicyclohexyl phthalate | 27.2 |
| Hercules Polypale WG ($H_2SO_4$-modified wood rosin; Hercules Powder Co., U.S.P. 2,017,866) | 8.0 |
| Pentaerythritol tetrastearate | 1.6 |
| Petrex 7–HT (diethylene glycol ester of "Petrex" acid-terpenemaleic acid; Hercules Powder Co., U.S.P 2,236,546) | 19.2 |
| Ethyl acetate | 546.0 |
| Toluene | 261.0 |
| Ethyl alcohol | 35.0 |
| Maleic acid | 8.0 |

The resulting coated film had an oxygen permeability value (O.P.V.) of 30.5. Table I shows comparative O.P.V.'s for a commercially available transparent regenerated cellulose film having a moistureproof, heat-sealing coating on one side of the film (designated in the trade as a fresh meat wrapper, a commercially available rubber hydrochloride film, and a commercially available polyethylene film) 0.0015" thick. The film of this invention is seen to be far superior in oxygen transmission and hence in color retention of the packaged meat.

Table I

| | O.P.V. |
|---|---|
| Film of Example 1 | 30.5 |
| Commercially available fresh meat wrapper [1] | 8.0 |
| Rubber hydrochloride film .0008" thick | 5.5 |
| Polyethylene film 0.0015" thick | 9.0 |

[1] Transparent, regenerated cellulose film, 0.0012" thick, treated with a guanidine-modified urea-formaldehyde resin and coated on one side with the moistureproof heat-sealing composition of Example 2 in Chapman, U.S.P. 2,533,557.

Fresh meat wrapped in the coated film of this example and heat-sealed was stored under refrigeration for five days without any evidence of brown spot discoloration.

*Oxygen permeability value.*—Oxygen permeability value (O.P.V.) of a film represents the grams of oxygen which will pass through 100 square meters of the film in one hour under the test conditions. It is determined in the following manner:

A flat-bottomed, closed cell is provided with a sheet of filter paper covering the bottom surface (i.e., floor) of the cell, with means for introducing and withdrawing air from the space above the filter paper, and with inlet means below the sheet of filter paper for introducing liquid to saturate the filter paper. A sample of the film to be tested, coextensive in area with the sheet of filter paper, is placed over the filter paper, uncoated side down and in contact with the upper surface of the sheet of filter paper. A specific volume of bone-dry air is circulated over the top surface (coated) of the film at a constant rate, at a constant pressure (as close to atmospheric pressure as possible), and at a constant temperature. The circulating air passes through a dryer containing dry $CaSO_4$ and through a Beckman para magnetic oxygen analyzer which measures the oxygen content of the air. The filter paper at the bottom of the cell is saturated with a measured amount of pyrogallol 1.0 M solution having a pH NaOH 8.7. The amount of $O_2$ (oxygen) passing through the film into the pyrogallol solution over a 15 minute period is determined from the percent $O_2$ readings over that period on the Beckman para magnetic oxygen analyzer. The O.P.V. is calculated from the consumption of oxygen during the 15 minute period. It is important that the circulating air be kept bone dry since traces of moisture vapor will affect the evaluation adversely.

It has been found that the wrapper film must have an oxygen permeability value of at least 20 in order to satisfactorily inhibit brown spot discoloration of packaged fresh meat.

EXAMPLE 2

Regenerated cellulose film, 0.0012″ thick when dry, was pretreated with an anchoring resin as in Example 1. The dried film was then coated on one side, at the rate of three grams of solids per square meter of film, with the following oxygen-transmitting, heat-sealable coating composition:

| | Parts by weight |
|---|---|
| Nitrocellulose (11.% nitrogen) | 49.5 |
| Dibutyl phthalate | 16.0 |
| Dicyclohexyl phthalate | 16.0 |
| Polymerized resin (gum rosin treated with $H_2SO_4$, U.S.P. 2,017,866) | 3.0 |
| "Petrex 7" (diethylene glycol ester of "Heet-Rex" acid, U.S.P. 2,236,546) | 13.0 |
| Pentaerythritol distearate | 2.5 |
| Ethyl acetate | 490.0 |
| Toluene | 240.0 |
| Ethyl alcohol | 24.0 |

The coated film had an oxygen permeability value of 27.5. Fresh meat wrapped in the coated film showed no brown spot discoloration after five days' storage under normal refrigeration.

Following are further examples of coating compositions containing ester waxes which give coated films with satisfactory oxygen permeability characteristics when coated on one side of transparent, regenerated cellulose film. Fresh meat wrapped in the films and the wrapper heat-sealed does not develop brown spot discoloration under normal refrigeration even after five days.

EXAMPLE 3

| | Parts by weight |
|---|---|
| Nitrocellulose (11.6% nitrogen) | 50.0 |
| Pentaerythritol mono-stearate | 2.0 |
| Dammar, dewaxed | 7.0 |
| Dicyclohexy phthalate | 30.5 |
| Dibutyl phthalate | 10.5 |
| Toluene | 245.0 |
| Ethyl acetate | 450.0 |
| Ethyl alcohol | 35.0 |

EXAMPLE 4

| | |
|---|---|
| Ethyl cellulose (medium viscosity) | 61.5 |
| Ester gum (glycerol ester of rosin) | 25.0 |
| Dibutyl phthalate | 11.0 |
| Pentaerythritol tri-stearate | 2.5 |
| Toluene | 580.0 |
| Ethyl alcohol | 150.0 |

EXAMPLE 5

| | |
|---|---|
| Chlorinated rubber (66–68% chlorine) | 66.7 |
| Pentaerythritol dipalmitate | 3.0 |
| Chlorinated paraffin wax (42% chlorine) | 30.0 |
| Calcium salt of hydrogenated rosin | 0.3 |
| Toluene | 550.0 |

EXAMPLE 6

| | |
|---|---|
| Nitrocellulose (11.5% nitrogen) | 49.0 |
| Pentaerythritol tri-palmitate | 2.0 |
| Dammar, dewaxed | 14.0 |
| Dicyclohexy phthalate | 17.5 |
| Dibutyl phthalate | 17.5 |
| Toluene | 245.0 |
| Ethyl acetate | 450.0 |
| Ethyl alcohol | 35.0 |

EXAMPLE 7

| | |
|---|---|
| Nitrocellulose (11.4% nitrogen) | 49.5 |
| Dibutyl phthalate | 16.0 |
| Dicyclohexyl phthalate | 16.0 |
| Polymerized rosin | 3.0 |
| "Petrex 7" | 13.0 |
| Pentaerythritol dimyristate | 2.5 |
| Ethyl acetate | 490.0 |
| Toluene | 240.0 |
| Ethyl alcohol | 24.0 |

EXAMPLE 8

| | |
|---|---|
| n-Butyl methacrylate polymer | 25.0 |
| Nitrocellulose (11.6% nitrogen) | 25.0 |
| Pentaerythritol tetra-myristate | 2.0 |
| Dibutyl phthalate | 11.0 |
| Ester gum | 37.0 |
| Toluene | 290.0 |
| Ethyl acetate | 425.0 |
| Ethyl alcohol | 15.0 |

EXAMPLE 9

| | |
|---|---|
| Nitrocellulose (11.6% nitrogen) | 50.0 |
| Pentaerythritol di-laurate | 2.0 |
| Dammar, dewaxed | 7.0 |
| Dicyclohexyl phthalate | 30.5 |
| Dibutyl phthalate | 10.5 |
| Toluene | 245.0 |
| Ethyl acetate | 450.0 |
| Ethyl alcohol | 35.0 |

EXAMPLE 10

| | |
|---|---|
| Ethyl cellulose (medium viscosity) | 61.5 |
| Ester gum | 25.0 |
| Dibutyl phthalate | 11.0 |
| Pentaerythritol mono-laurate | 2.5 |
| Toluene | 580.0 |
| Ethyl alcohol | 150.0 |

EXAMPLE 11

| | Parts by weight |
|---|---|
| Nitrocellulose (11.6% nitrogen) | 50.0 |
| Pentaerythritol di-arachidate | 1.5 |
| Dammar, dewaxed | 7.0 |
| Dicyclohexyl phthalate | 31.0 |
| Dibutyl phthalate | 10.5 |
| Toluene | 245.0 |
| Ethyl acetate | 450.0 |
| Ethyl alcohol | 35.0 |

EXAMPLE 12

| | |
|---|---|
| Nitrocellulose (11.6% nitrogen) | 50.0 |
| Pentaerythritol di-lignocerate | 1.0 |
| Dammar, dewaxed | 7.0 |
| Dicyclohexyl phthalate | 31.0 |
| Dibutyl phthalate | 11.0 |
| Toluene | 245.0 |
| Ethyl acetate | 450.0 |
| Ethyl alcohol | 35.0 |

We claim:

1. A package comprising fresh meat wrapped in a transparent, flexible, heat-sealed wrapper comprising regenerated cellulose film having on one surface only thereof from 2 to 4 grams per square meter of a heat-sealable, continuous coating comprised essentially of a film-former, a blending agent and a moistureproofing agent consisting of at least one ester of pentaerythritol and a saturated aliphatic monocarboxylic acid having from 12 to 35 carbon atoms, the coated film having an oxygen permeability value of at least 20, the uncoated surface of said coated film being placed in contact with said meat and constituting the inner surface of said wrapper.

2. A package comprising fresh meat wrapped in a transparent, flexible, heat-sealed wrapper comprising regenerated cellulose film having on one surface only thereof from 2 to 4 grams per square meter of a heat-sealable, continuous coating comprised essentially of a film-former, a blending agent, and from 0.5% to 3.0% by weight, based on the total weight of the coating, of a moistureproofing agent consisting of at least one ester of pentaerythritol and a saturated aliphatic monocarboxylic acid having from 12 to 35 carbon atoms, the coated film having an oxygen permeability value of at least 20, the uncoated surface of said coated film being placed in contact with said meat and constituting the inner surface of said wrapper.

3. The package of claim 2 wherein the pentaerythritol ester is pentaerythritol tetrastearate.

4. A method for preserving the color and condition of fresh meats which comprises wrapping fresh meat in a transparent, flexible, heat-sealable wrapper comprising a regenerated cellulose base film having on one side only a continuous heat-sealable coating comprising essentially a film-former, a blending agent and a moistureproofing agent consisting of at least one ester of pentaerythritol and a saturated aliphatic monocarboxylic acid having from 12 to 35 carbon atoms, the weight of coating being within the range of from 2 to 4 grams per square meter of coated base film surface, the coated film having an oxygen permeability value of at least 20, the uncoated surface of said coated film being placed in contact with said meat and constituting the inner surface of said wrapper.

5. A method for preserving the color and condition of fresh meats which comprises wrapping fresh meat in a transparent, flexible, heat-sealable wrapper comprising a regenerated cellulose base film having on one side only a continuous heat-sealable coating comprising essentially a film-former, a blending agent, and from 0.5% to 3.0% by weight, based on the total weight of the coating, of a moistureproofing agent consisting of at least one ester of pentaerythritol and a saturated aliphatic monocarboxylic acid having from 12 to 35 carbon atoms, the weight of coating being within the range of from 2 to 4 grams per square meter of coated base film surface, the coated film having an oxygen permeability value of at least 20, the uncoated surface of said coated film being placed in contact with said meat and constituting the inner surface of said wrapper.

6. The method of claim 5 wherein the pentaerythritol ester is pentaerythritol tetrastearate.

References Cited in the file of this patent

UNITED STATES PATENTS

| | | |
|---|---|---|
| 2,561,010 | Carson | July 17, 1951 |
| 2,561,011 | Carson | July 17, 1951 |
| 2,639,241 | Cornwell | May 19, 1953 |
| 2,772,172 | Carson | Nov. 27, 1956 |

UNITED STATES PATENT OFFICE

CERTIFICATE OF CORRECTION

Patent No. 2,931,732                                                April 5, 1960

William August Hoffman et al.

It is hereby certified that error appears in the printed specification of the above numbered patent requiring correction and that the said Letters Patent should read as corrected below.

Column 3, line 52, in the table, for "(11.% nitrogen)" read -- (11.4% nitrogen) --; column 4, line 6, Example 3, and line 32, Example 6, for "Dicyclohexy", each occurrence, read -- Dicyclohexyl --.

Signed and sealed this 13th day of September 1960.

(SEAL)

Attest:
KARL H. AXLINE
Attesting Officer

ROBERT C. WATSON
Commissioner of Patents